(12) United States Patent
Sugiyama et al.

(10) Patent No.: US 8,179,134 B2
(45) Date of Patent: May 15, 2012

(54) HANDLING ROBOT OF MAGNETIC HEAD ASSEMBLY, MAGNETIC HEAD TEST METHOD AND MAGNETIC HEAD TESTER

(75) Inventors: Toshinori Sugiyama, Kodama-gun (JP); Shinji Honma, Kodama-gun (JP); Yoshinori Tokumura, Hiratsuka (JP); Hideki Mochizuki, Kodama-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 511 days.

(21) Appl. No.: 12/490,408

(22) Filed: Jun. 24, 2009

(65) Prior Publication Data
US 2009/0323212 A1 Dec. 31, 2009

(30) Foreign Application Priority Data

Jun. 30, 2008 (JP) .................................. 2008-169993

(51) Int. Cl.
*G01R 33/00* (2006.01)
*G01R 33/12* (2006.01)
(52) U.S. Cl. ........................................ 324/262; 324/210
(58) Field of Classification Search .................. 324/262, 324/210
See application file for complete search history.

(56) References Cited

FOREIGN PATENT DOCUMENTS
JP  2001-52319 A  2/2001
JP  2006-179107 A  7/2006

*Primary Examiner* — Reena Aurora
(74) *Attorney, Agent, or Firm* — Mattingly & Malur, PC

(57) ABSTRACT

An upward warp of a terminal pad of a flexible cable which is kept horizontal by a suction head is prevented by a pressing arm which contacts with an upper surface of a rear portion of the flexible cable.

14 Claims, 5 Drawing Sheets

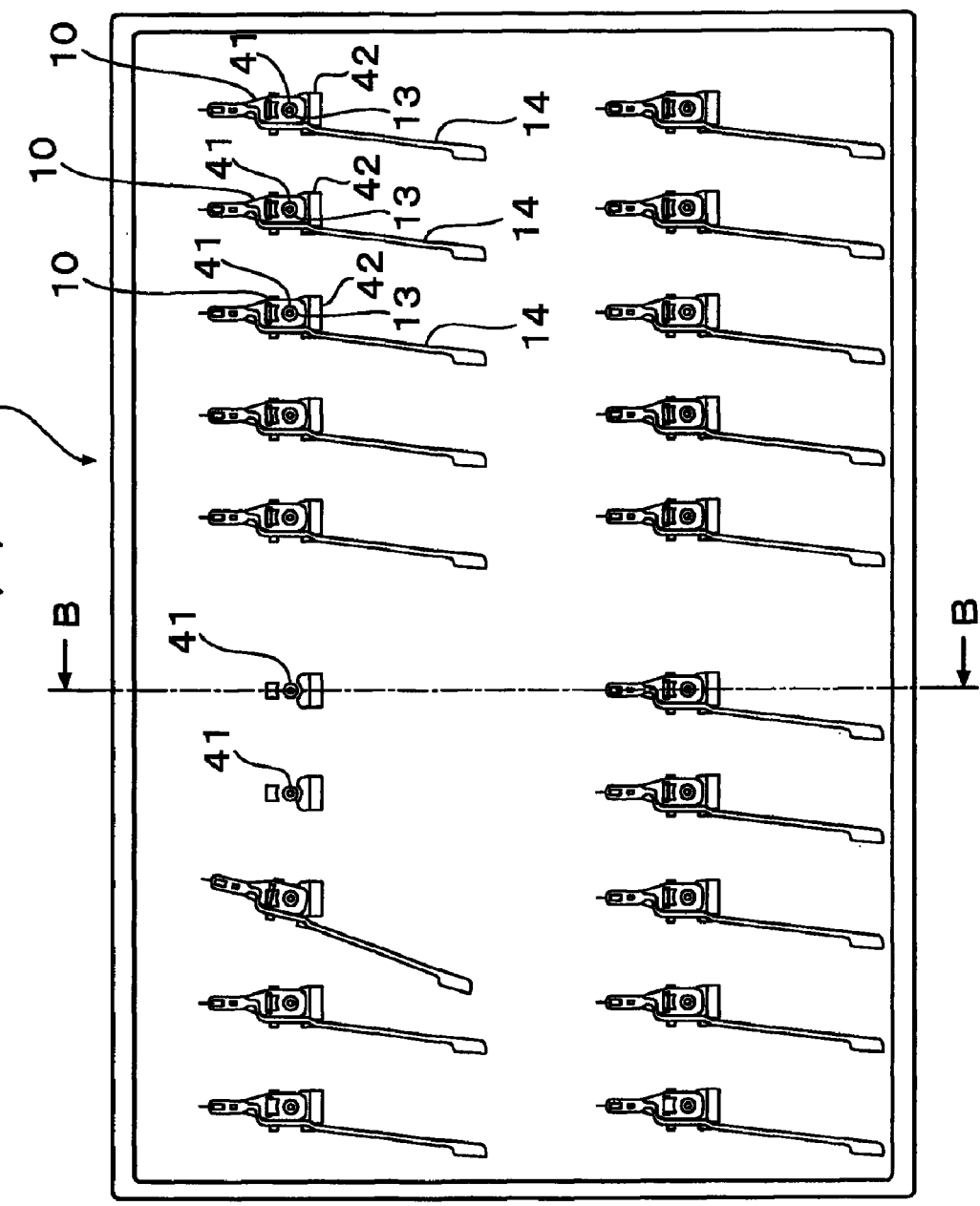

HANDLING ROBOT OF MAGNETIC HEAD ASSEMBLY, MAGNETIC HEAD TEST METHOD AND MAGNETIC HEAD TESTER

TECHNICAL FIELD

This invention relates to a handling robot of a magnetic head assembly, a magnetic head test method and a magnetic head tester and, in particular, this invention relates to a handling robot of a magnetic head assembly, which is easy to hold an electrical contact between a flexible printed circuit board and a contact unit when the magnetic head assembly (including a magnetic head and a suspension spring) is set on a head clamp table of the magnetic head tester and is suitable to automate a magnetic head test and to a handling robot of the magnetic head assembly.

BACKGROUND ART

A recent magnetic head assembly includes a suspension spring in the order of 15 mm×20 mm and a slider of several to 1 mm square provided in a top portion of the suspension spring, in which a gap between a thin film magnetic head and a magnetic disk is reduced to in the order of several to 10 nm.

The performance tests of the magnetic disk as an information recording medium of HDD and the magnetic head (magnetic head assembly) for writing data on the magnetic disk and reading data from the magnetic disk are performed precisely by respective testers in the manufacturing steps.

In order to improve the test efficiency of the magnetic disk or the magnetic head, JP-A-2001-52319 and JP-A-2006-179107 describe a tester having a plurality of test decks and processing signals from the magnetic heads by distributing signals from the test decks between the test decks or selectively switching the test decks.

The magnetic heads are tested by the magnetic head tester with a unit of magnetic head assembly and the magnetic head assembly, the magnetic heads of which are tested, is switched to a new magnetic head assembly after the test is ended. The switching is made by handwork at present.

The test is interrupted during the switching of magnetic head and the measuring portion which receives a read signal from the magnetic head becomes standby state. Therefore, the test efficiency of the magnetic head assembly is dropped. On the other hand, the size of magnetic head assembly is reduced and a mounting of a magnetic head assembly on a head clamp table of a head carriage (which is performed by using a mounting hole (a protruded edge portion) of the magnetic head assembly). Further, a demounting working efficiency of the magnetic head assembly is low and, therefore, through-put of the head test depends on the switching work of the magnetic head assembly.

Under the circumstance, the switching operation of magnetic head assembly may be automated. However, up to now, the test of magnetic head assembly must be performed by contacting a probe of a contact probe unit with a terminal pad of a flexible printed circuit board (referred to "flexible cable" hereinafter) connected to magnetic heads.

About 6 probes (pogo pins) are provided in the contact probe unit. However, in a case where the flexible cable is curved or bent when the magnetic head assembly is set on the head clamp table of the magnetic head tester, the flexible cable can not electrically contact with the contact unit.

The flexible cable extends rearward from a mounting base of the magnetic head assembly and has a front end portion in which a magnetic head is provided and a rear portion on which a terminal pad is provided. The terminal pad is mounted on a terminal pad pedestal provided below the contact unit. However, the terminal pad tends to curve upward by wind generated by rotation of a disk positioned in the magnetic head clamp table or in the vicinity thereof before it is mounted on the terminal pad pedestal. Further, even in a case where the terminal pad is mounted on the terminal pad table, there is a problem that the terminal pad is floated and flatters due to the wind.

In order to automate the exchange operation of magnetic head assembly, it is necessary to transport the magnetic head assembly to the head clamp table with using a handling robot and to mount a magnetic head assembly on the head clamp table. However, even when the magnetic head assembly is mounted, the terminal pad is curved upward due to wind caused by the magnetic disk and can not be mounted on the terminal pad pedestal. In such case, it is impossible to ensure the contact of the terminal on the terminal pad with the probe of the contact probe unit. Therefor, there is a problem that the test of magnetic head can not be performed automatically.

SUMMARY OF THE INVENTION

Therefore, an object of this invention is to provide a handling robot for handling a magnetic head assembly with which it is easy to ensure the electrical contact between a flexible cable and a contact unit when the magnetic head assembly is set on a head clamp table of a magnetic head tester.

Another object of this invention is to provide a magnetic head test method or a magnetic head tester having a handling robot for handling a magnetic head assembly, which is suitable for automation of the magnetic head test.

According to a first invention for achieving such objects, a handling robot for mounting the magnetic head assembly on a head clamp table of a magnetic head tester by sucking a mounting base with respect to the magnetic head assembly having a flexible cable which has a front end portion in which a magnetic head is provided and a rear end portion on which a terminal pad connected to the magnetic head is provided, by a suction head of the handling robot, comprises the suction head for holding the flexible cable of the magnetic head assembly in such a way that, when the magnetic head assembly is mounted on the head clamp table, the flexible cable becomes horizontal and a pressing arm provided on the suction head for preventing upward warp of the rear portion of the horizontal flexible cable, wherein the pressing arm contacts with the upper surface of the rear portion of the horizontal flexible cable.

The magnetic head test method or the magnetic head tester of the second invention comprises the handling robot having the suction head on which the pressing arm and a clamp mechanism of a magnetic head assembly provided on the head clamp table, wherein the clamp mechanism clamps the magnetic head assembly which is mounted on the head clamp table with released suction by the suction head.

In the first and second inventions, it is possible to prevent upward warp of the rear portion of the horizontal flexible cable by contacting the pressing arm with the upper surface of the rear portion of the flexible cable. Therefore, the rear portion of the flexible cable is hardly warped upward even when wind is generated by rotation of a magnetic disk when the magnetic head assembly is positioned on the head clamp table. Even when the terminal pad on the rear portion is set on a terminal pad pedestal, the terminal pad is hardly floated.

Incidentally, it is preferable that the pressing arm contacts with the upper surface of the flexible cable at a position behind at least a half of a length of the flexible cable from the mounting base to the terminal pad. Further, the pressing arm may not merely contact with the horizontal flexible cable but press the rear end portion of the flexible cable down.

The terminal pad of the flexible cable held horizontally is mounted on the terminal pad pedestal when the magnetic head assembly is mounted on the head clamp table. In such case, since the terminal pad is set on the terminal pad pedestal in a state where the upper surface of the rear portion of the flexible cable is reliably pressed by the pressing arm, it is possible to reliably contact the contact probe of the contact probe unit with the terminal on the terminal pad.

Further, when a suction mechanism is provided on the terminal pad pedestal, it is possible to fix the terminal pad on the terminal pad pedestal reliably. Therefore, a reliable contact between the probe of the contact probe unit and the terminal of the terminal pad can be obtained even when the suction head is removed from the clamp table. As a result, the head tester can automatically enter into the head test.

BRIEF DESCRIPTION OF THE DRAWINGS

FIG. 3(a) shows a plane view of the magnetic head assemblies arranged in a tray and FIG. 3(b) shows a B-B cross section of the tray.

DESCRIPTION OF THE PREFERRED EMBODIMENT

Figure 1A:
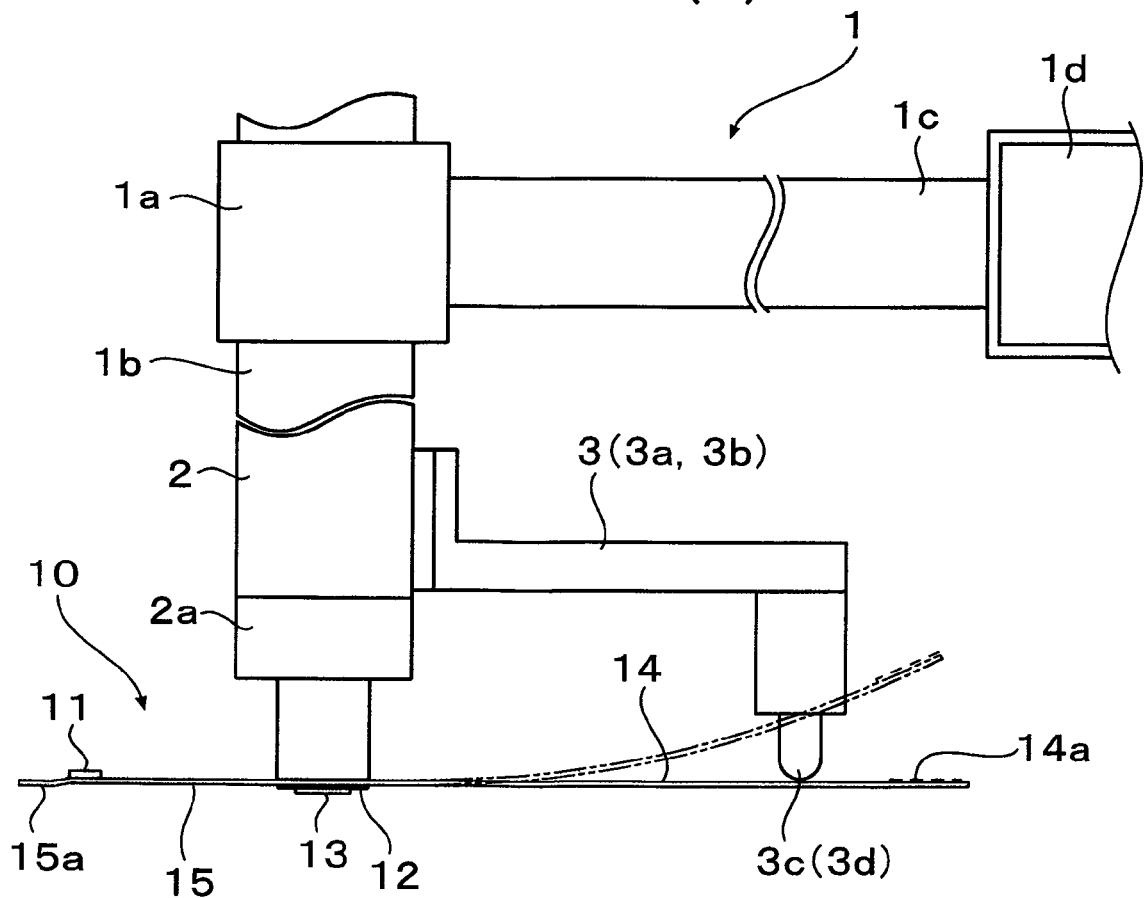
FIG. 1(a) is a side view of a handling robot of a magnetic head assembly according to an embodiment of the present invention and FIG. 1(b) is a plane view of an adsorption head of the handling robot.
Figure 1B:
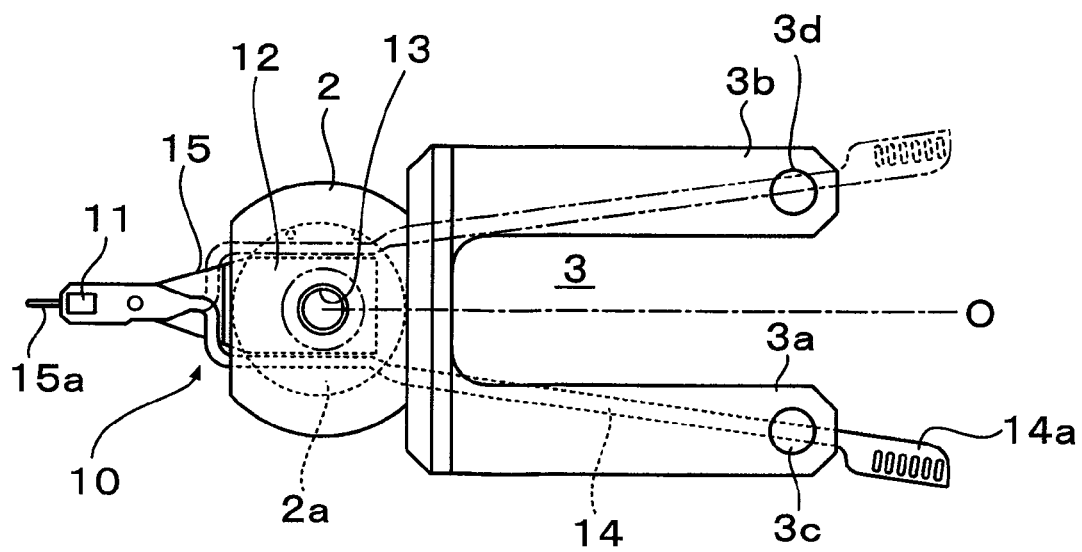

In FIGS. 1(a) and 1(b), a reference numeral 1 depicts a handling robot, 2 a suction head and 3 a pressing arm for preventing an upward bending of a flexible cable 14 provided on the adsorption head 2.

A suction cylinder collet 2a (referred to cylinder collet, hereinafter) extends downward from the suction head 2 and the suction head sucks the magnetic head assembly 10 such that the flexible cable 14 is held horizontal by the cylinder collet 2a.

The handling robot 1 includes a Z moving mechanism 1a and the suction head 2 is mounted on a lower portion of an elevation arm 1b. The handling robot 1 transports the magnetic head assembly 10 sucked by the suction head 2 onto a head clamp table 50 (refer to FIG. 5(a)).

A magnetic head 11 is provided on a front end portion of the magnetic head assembly 10 includes a mounting base 12 and a flexible cable 14 extends rearward from about a center portion in which a mounting base 12 is provided. A mounting hole 13 is provided in the mounting base 12 of the magnetic head assembly 10. Terminal pads 14a are provided on rear end portions of the flexible cables 14.

A portion of the flexible cable 14 on the side of the magnetic head 11 with respect to the mounting base 12 is referred to a front portion and a portion of the flexible cable 14 on the terminal pad 14a is referred to a rear portion. The flexible cable 14 is connected to the magnetic head 11 arranged along a suspension spring 15 of the magnetic head assembly 10 and derived from the rear end portion of the mounting base 12 to the terminal pad 14. Therefore, the flexible cables 14 and the magnetic head assembly are united.

Incidentally, a protrusion 15a provided in a top end of the suspension spring 15 is a joining protrusion for lump-loading the magnetic head 11.

In the magnetic head assembly 10 sucked by the suction head 2, the pressing arm 3 includes two arms 3a and 3b which horizontally extend from the suction head 2 toward the rear end portions of the flexible cables 14. Boss pins 3c and 3d extend downward from the rear ends of the arms 3a and 3b, respectively. Top ends of the boss pins 3c and 3d are in contact with the upper surfaces of the horizontal flexible cable 14. As a result, the rear portion of the flexible cables can not be warped upward as shown in long dashed double-short dashed line in FIG. 1(a).

Figure 2A:
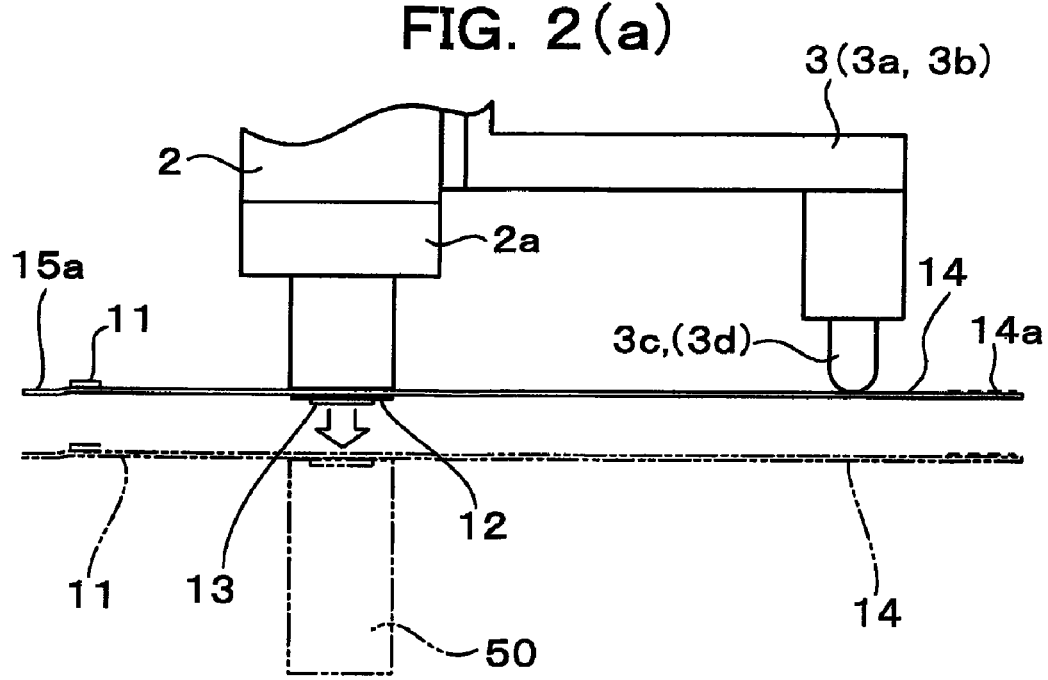
FIG. 2(a) is a side view of a magnetic head assembly.

In this embodiment, top ends of the boss pins 3c and 3d are rounded and positioned in the near side of the terminal pads 14a (in vicinity of the terminal pad 14a) as shown in FIG. 1(a). Further, a vertical position of top ends of the boss pins 3c and 3d corresponds to a vertical position of an suction surface of the cylindrical collet 2a as shown in FIG. 2(a). A vertical distance of the boss pin 3c (3d) from the arm 3a (3b) is set such that, when the magnetic head assembly 10 is sucked by the cylindrical collet 2a, the flexile cables 14 become horizontal.

It is preferable to set the contact position of the flexible cable 14 with the boss pin 3c (3d) in between a center position of a length of the flexible cable 14 from the mounting base 12 to the terminal pad 14a and the terminal pad 14a. This is because the contact point of the boss pin 3c (3d) with the flexible cable 14 becomes a position in which the flexible cable 14 is hardly bent and the boss pin does not contact with the terminal pad 14a.

In the magnetic head assemblies set in a tray 4 as own in FIG. 3, the pressing arm 3a presses the flexible cable 14 which extends from the left side of the mounting base 12. On the other hand, the pressing arm 3b presses the flexible cable 14 which extends from the right side of the mounting base 12.

That is, as shown by a long dashed double-dashed line in FIG. 1(b), there are two kinds of flexible cable 14 in one of which the terminal pad 14a thereof is arranged in a direction orthogonal to a center axis in a longitudinal direction of the magnetic head assembly 10 with a predetermined offset in a horizontal plane containing the center axis of the magnetic head assembly 10 and, in the other of which the offset direction is opposite.

Thus, the pressing arms 3a and 3b are arranged symmetrically with respect to the center line (the center line O of the magnetic head assembly 10) which divides the suction plane of the cylindrical collet 2a.

As shown in FIG. 1(a), the handling robot 1 includes an X moving mechanism 1c, a Y moving mechanism 1d and a Z moving mechanism 1a. The Z moving mechanism 1a is mounted on the X moving mechanism 1c which is mounted on the Y moving mechanism 1d. The cylindrical collet 2a can be moved in X, Y and Z directions.

Figure 2B:
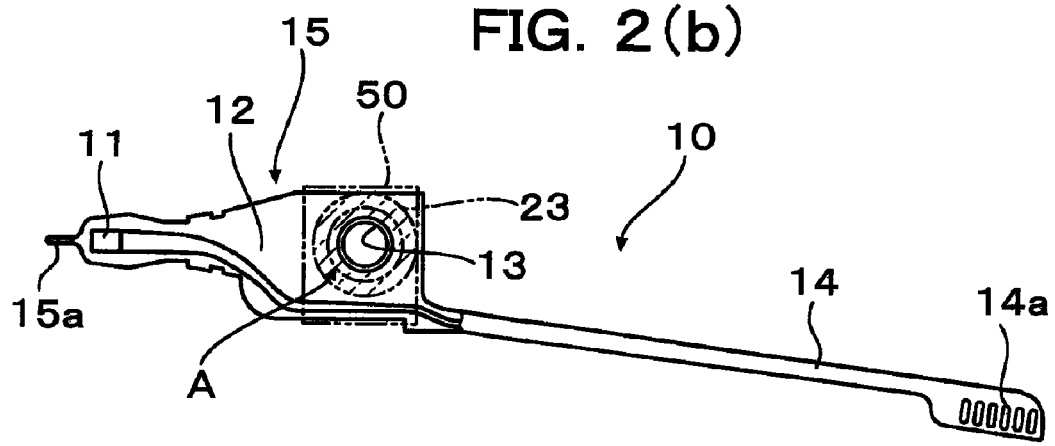
FIG. 2(b) is a plane view of the magnetic head assembly and FIG. 2(c) shows a suction surface of a suction head.
Figure 2C:
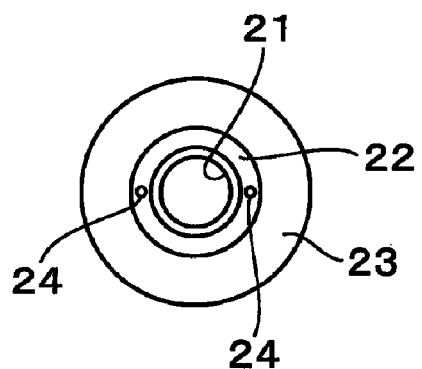

As shown in FIGS. 2(a) and 2(b), the cylindrical collet 2a holds the magnetic head assembly 10 by sucking a periphery A of the positioning mounting hole 13 of the mounting base 12 of the magnetic head assembly. As shown in FIG. 2(c) which is a front view of the suction portion, an suction plane of the cylindrical collet 2a includes a hollow center portion 21 and a circular thin groove 22 is formed along a circumference of a thick portion 23. Two suction holes 24 are provided in a bottom of the groove 22. The adsorption holes 24 are connected to a negative pressure pump and the mounting base 12 of the magnetic head assembly 10 is sucked by negative pressure.

On the other hand, the magnetic head assemblies 10 are arranged on the tray 4 as shown in FIG. 3. The hollow center portion 21 of the cylindrical collet 2a constitutes an air suction hole of a boss pin 41 (refer to boss pin 41 in the tray 4 shown by a side cross section in FIG. 3(b)) and a positioning pin 52a of a clamp table 50 (refer to FIG. 4(a)). An inner diameter of the thick portion 23 is slightly larger than an outer diameter of the positioning mounting hole 13 formed in the mounting base 12 of the magnetic head assembly 10 shown in FIG. 2(b) so that a circumference of the mounting hole 13 can be sucked.

As shown by the plan view of FIG. 3(a) and a B-B cross section of FIG. 3(b), the tray 4 is a rectangular box having a low edge and a total of 20 boss pins 41 are arranged on a bottom of the tray in two lines which are separated by a predetermined distance. The mounting holes 13 of a total of 20 magnetic head assemblies 10 are fitted in the boss pins 41 in the tray 4. Incidentally, a reference numeral 42 in the tray 41 depicts a pedestal of the mounting base 12.

Figure 4A:
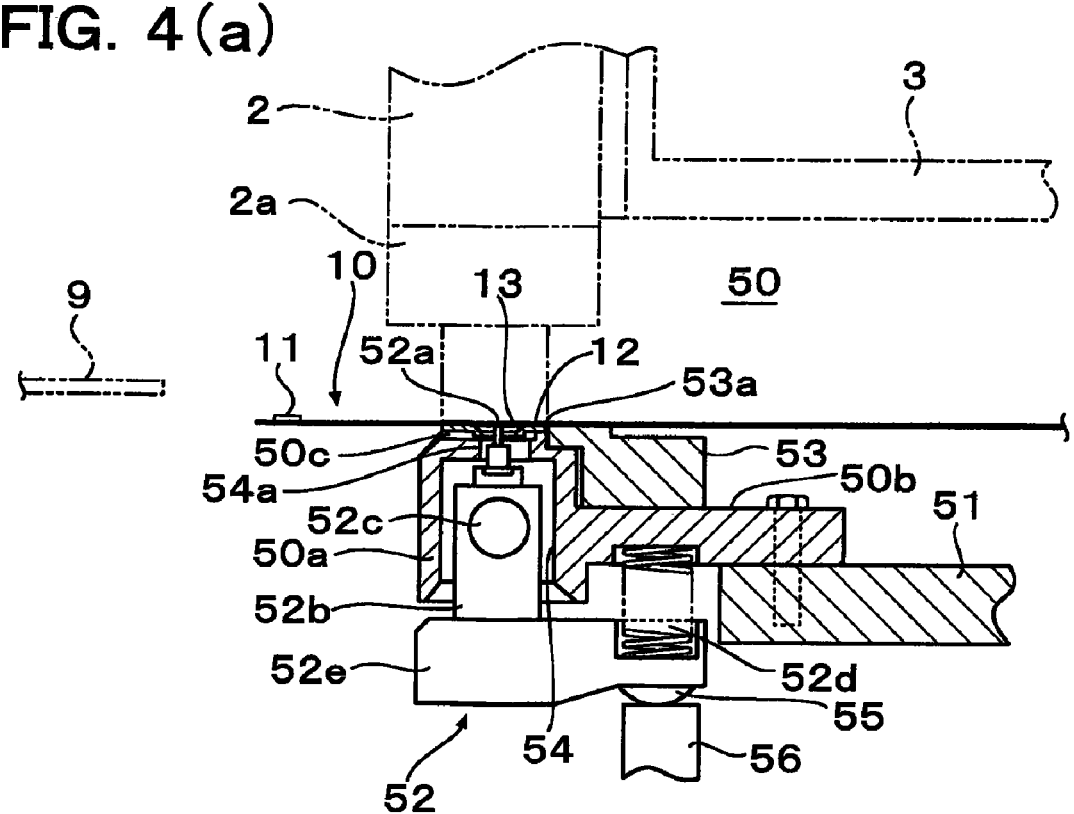
FIG. 4(a) shows a partial cross section of a head clamp mechanism provided on a head clamp table before the magnetic head assembly is clamped and FIG. 4(b) shows a partial cross section of a head clamp mechanism provided on a head clamp table after the magnetic head assembly is clamped.

One of the 20 magnetic head assemblies 10 in the tray 4 is sucked by the cylindrical collet 2a. The mounting hole 13 of the mounting base 12 of the magnetic head assembly 10 protrudes downward. That is, the upper surface of the magnetic head assembly 10, on which the magnetic head 11 is provided, is sucked, as shown in FIGS. 2(a) and 2(b). As a result, the magnetic head assembly 10 transported by the handling robot 1 is mounted on the clamp table 50 (to be described later) such that the magnetic head assembly 10 opposes to a rear surface of the magnetic disk 9, as shown in FIG. 4(a).

As shown in FIG. 2(a), the mounting hole 13 has a flange protruding on the side opposite to the surface sucked by the cylindrical collet 2a. The flange is formed on the upper side (back side in the drawing) of the mounting base 12 by punching and caulking from the upper side in the drawing.

Now, the head clamp table and the head clamp mechanism which is provided on the head clamp table and performs an automatic clamping correspondingly to a control of a control portion will be described.

As shown in FIG. 2(a), when the magnetic head assembly 10 is mounted on the head clamp table 50, the handling robot 1 holds the flexible cable 14 of the sucked magnetic head assembly 10 such that the flexible cable becomes horizontal.

Figure 5A:
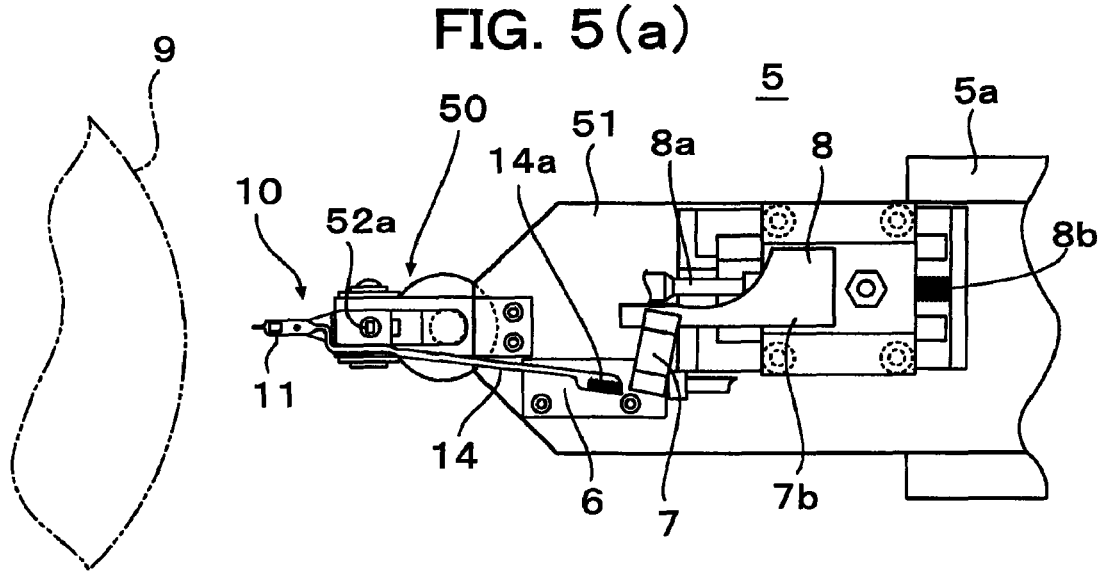
FIG. 5(a) is a plan view of the head clamp table of a magnetic head tester.

As shown by the plan view in FIG. 5(a), the head clamp table 50 is fixedly provided on the top end side of a head arm (or a carriage arm) 51 mounted on the moving table 5a of the carriage 5.

Figure 4B:
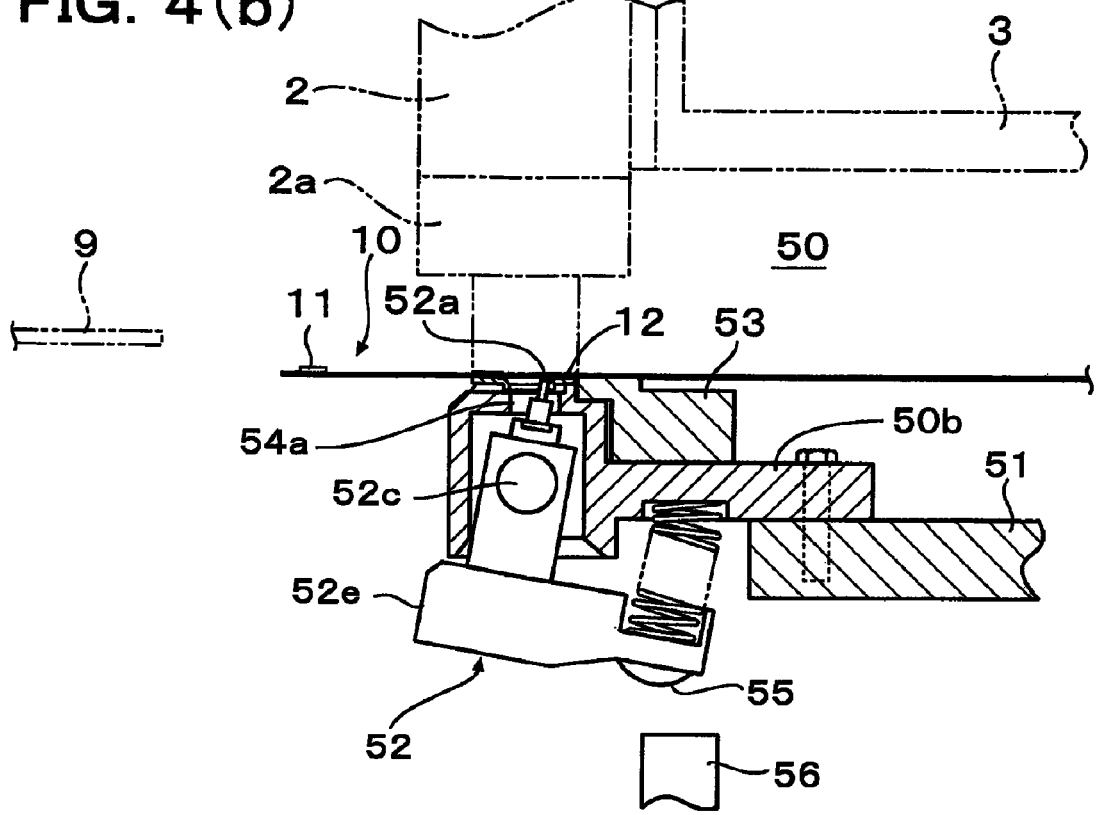

FIGS. 4(a) and 4(b) show a partially cross-sectioned head clamp mechanism provided on the head clamp table 50.

A swinging positioning mechanism 52 for swinging the positioning pin 52a is provided in the clamp table 50. Incidentally, the positioning pin 52a has a rectangular cross section as shown in FIG. 5(a).

The handling robot 1 which has sucked the magnetic head assembly 10 positions the sucking head 2 (cylindrical collet 2a) in the position of the positioning pin 52a by using an XY position coordinate of the positioning pin 52a of the swinging positioning mechanism 52 as a reference and lowers in Z direction by a predetermined distance (refer to FIG. 2(a)). The handling robot 1 can easily fit the positioning pin 52a in the mounting hole 13 of the mounting base 12. Therefore, the magnetic head assembly 10 is mounted on the clamp table 50.

As shown in FIG. 4(a), an abutment 53 having a contact head portion 53a is provided in a rear portion of the clamp table 50. The abutment block 53 is mounted on a bracket portion 50b extending horizontally from a rear portion of the seat 50a of the clamp table 50 and is fixed thereto by a bolt screw, etc. The abutment block 53 stands up from the bracket portion 50b and protruded horizontally from the bracket portion 50b to a top position such that the contact head portion 53a corresponds to the rear end surface of the mounting base 12 of the magnetic head assembly 10 mounted on the clamp table 50.

The bracket portion 50b is supported by bolting to the head arm 51 and the respective clamp tables 50 are supported on the head carriages 5 by the bracket 50b.

A recessed portion 50c for receiving the mounting base 12 is provided in the head table pedestal 50a. The mounting hole 13 of the mounting base 12 of the magnetic head assembly 10 transported by the handling robot 1 is fitted on the positioning pin 52a and is mounted in the recessed portion 50c of the head table pedestal 50a.

The positioning pin 52a provided in the head portion of the swinging positioning mechanism 52 protrudes from the seat 50a and swings clockwise in a vertical plane. By this swinging, the mounting base 12 of the magnetic head assembly 10 is moved rearward such that the rear surface of the mounting base 12 contacts with the contact head portion 53a. As a result, the magnetic head assembly 10 is positioned and clamped by the mounting base 12 pinched between the slanted positioning pin 52a and the contact head portion 53a, as shown in FIG. 4(b).

The contact head portion 53a has a rectangular recess 53b at a center portion thereof and the mounting base 12 of the magnetic head assembly 10 is pressed by two protruded portions on both sides of the recessed portion. The positioning pin 52a having the rectangular cross section is engaged with the protruded hole 13 at two points, so that the mounting base 12 is pressed at four points. Therefore, the magnetic head assembly 10 is positioned with high precision.

As shown in FIGS. 4(a) and 4(b), the seat 50a has a through-hole 54 and the swinging positioning mechanism 52 is constructed with the positioning pin 52a, a swing lever 52b provided within the through-hole 54, a shat pin 52c and a coil spring 52d.

A lower end portion 52e of the reversed-T shaped swing level 52b extends horizontally and the energized coil spring 52d is provided between a lower surface of the bracket portion 50b and a rear side of the lower end portion 52e. The coil spring 52d is energized such that the positioning pin 52a swings in a rear side of a vertical plane thereof (refer to side cross-section in FIG. 4(b)).

A semispherical protrusion 55 is provided in a rear surface side of the lower end portion 52e of the swing lever 52b correspondingly to the position of the coil spring 52d. A rod 56 in an air cylinder moves forward to contact with the protrusion 55, so that the coil spring 52d is maintained in compressed state. In this state, the positioning pin 52a is maintained vertically and is positioned and clamped in a normal coordinate position as shown in a side cross-section in FIG. 4(a).

In this state, the mounting hole 13 of the positioning base 12 of the magnetic head assembly 10 transported by the handling robot is fitted with the positioning pin 52a by the lowering of the cylindrical collet 2a so that the mounting base 12 is mounted on the recessed portion 50c of the head table pedestal 50*a* (refer to FIG. 4(*a*)). Then the sucking of the cylindrical collet 2*a* is released.

When the air cylinder 56 is driven rearward, the positioning pin 52*a* swings clockwise from the state shown in FIG. 4(*a*) by the coil spring 52*d* as a guide to the state shown in FIG. 4(*b*) with using the suction surface of the cylindrical collet 2*a* as a guide. In this state, the swing positioning mechanism 52 positions and clamps the magnetic head assembly 10. The clamping in this case is due to the resiliency of the coil sprig 52*d* similarly to the conventional clamp mechanism.

Figure 5B:
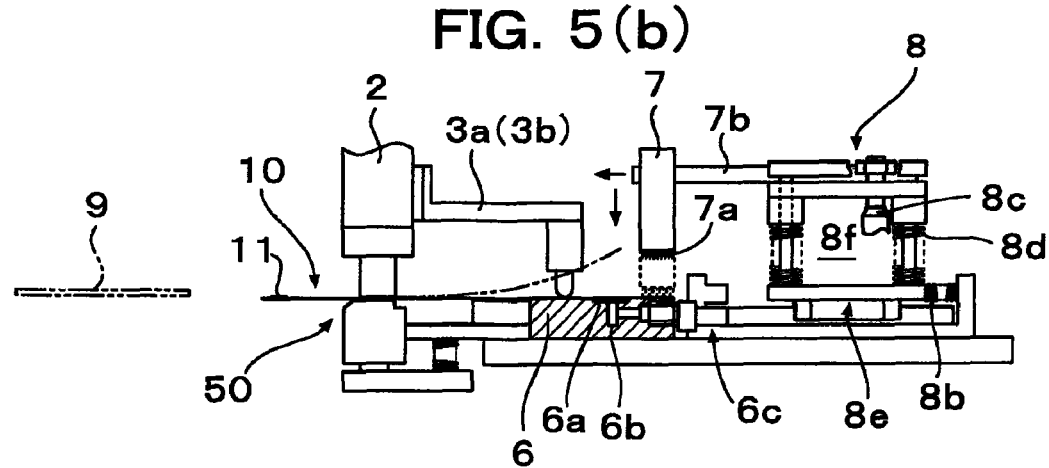
FIG. 5(b) shows a contact operation of a contact probe unit and FIG. 5(c) shows a contact state of the contact probe unit.
Figure 5C:
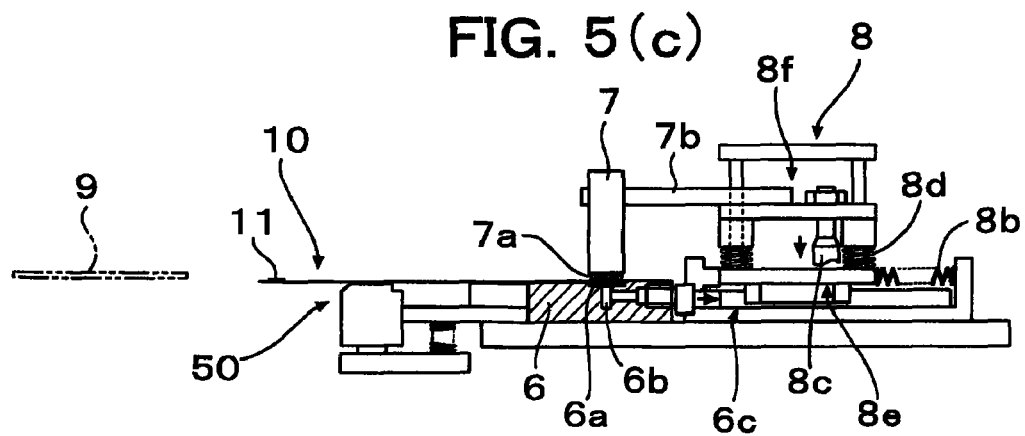

FIG. 5(*a*) is a plane view of the head clamp table of the magnetic head tester.

The head arm 51 provided on the head carriage 5 is moved in X axis direction when the carriage 5 is driven and, correspondingly thereto, the magnetic head 11 (refer to FIG. 2(*a*)) accesses a track of the magnetic disk 9. In this case, the magnetic head assembly 10 is clamped on the clamp table 50 and the contact probe unit 7 is connected to the terminal pad 14*a*. An X axis direction corresponds to a radial direction of the magnetic disk 9.

On the head arm 51, a terminal pad pedestal 6, the contact probe unit 7 and the XY moving mechanism 8 are mounted.

Incidentally, the magnetic disk 9 is mounted on a spindle (not shown) and rotated. The XZ moving mechanism 8 supports the contact probe unit 7 through the bracket 7*b*, moves the contact probe unit 7 along X axis direction in cooperation with the energizing coil spring 8*b* by driving the air cylinder 8*a* and, further, moves the contact probe unit 7 along Z axis direction (vertical direction) in cooperation with the energizing coil spring 8*d* (refer to FIG. 5(*b*)) by driving the air cylinder 8*c* (refer to FIG. 5(*b*)).

Incidentally, a reference numeral 8*e* depicts a slide guide mechanism in X axis direction and 8*f* a slide guide mechanism in Z axis direction.

Now, the contact control of the contact probe unit 7 will be described. This control is performed by a control portion (not shown). Since its control operation is clear from the description of the drawings, the details thereof is omitted.

FIG. 5(*a*) shows the contact probe unit 7 positioned in a home position.

As described before, the terminal pad pedestal 6 is positioned in the head arm 51 such that, when the magnetic head assembly 7 is mounted on the head clamp table 50 by the handling robot 1, the terminal pad 14*a* of the flexible cable 14 rides on the terminal pad pedestal 6.

Next, the magnetic head assembly 10 is clamped on the head clamp table when the suction of the suction head 2 is released. In such state, the terminal pad 14*a* of the flexible cable 14 is set in a guide hole 6*a* of the terminal pad pedestal 6.

Incidentally, when the magnetic head assembly 10 is clamped on the head clamp table 50, the suction of the suction head 2 is released. The position of the suction head 2 is maintained. In clamping, the suction surface of the cylindrical collet 2*a* guides the magnetic head assembly 10.

In order to receive the terminal pad 14*a* of the flexible cable 14, a guide hole 6*a* (refer to FIGS. 5(*b*) and 5(*c*)) having a configuration corresponding to a configuration of the terminal pad 14*a* is provided in the terminal pad pedestal 6. The guide hole 6*a* is positioned such that the terminal pad 14*a* of the flexible cable 14 is put thereon when the magnetic head assembly 10 is clamped on the head clamp table 50.

A vacuum suction hole 6*b* (refer to FIGS. 5(*b*) and 5(*c*)) is provided in a bottom of the guide hole 6*a*. The terminal pad 14*a* mounted and clamped on the terminal pad pedestal 6 is sucked and fixed in the guide hole 6*a* by the suction mechanism 6*c*.

In such state, the probe unit 7 is still in the home position.

When the terminal pad 14*a* is sucked and fixed in the guide hole 6*a*, the XZ moving mechanism 8 is driven under control of the control portion. When the XZ moving mechanism 8 is driven, the contact probe unit 7 is moved upward from the home position and then forward to a state shown in FIG. 5(*b*). Incidentally, in this state, the terminal pad 14*a* of the flexible cable 13 shown by the long dashed double-short dashed line is jumped up due to wind generated by the rotating magnetic disk. In this embodiment, such state never occurs since the pressing arm 3 is in contact with the upper surface side of the sucked flexible cable 14.

When the contact probe unit 7 is moved up and then moved in X direction by a predetermined amount, it becomes above the guide hole 6*a*. Therefore, the respective pogo pins (probes) 7*a* provided on the top end side of the contact probe units 7 are arranged on the terminal pads 14*a* in the guide hole 6*a*. In this state, when the contact probe unit 7 is lowered in Z direction by a predetermined amount due to the driving of the XZ moving mechanism 8, the respective pogo pins 7*a* of the contact probe units 7 contact with the respective terminals provided in the terminal pads 14*a* (refer to the respective pogo pins (probes) 7*a* shown by the dotted line. In this state, the suction head 2 the suction of which is released is put on the head clamp table 50.

When the respective pogo pins 7*a* contact with the respective terminals provided on the terminal pads 14*a*, the handling robot 1 operates such that the suction head 2 is retreated from the head clamp table 50 as shown in FIG. 5(*c*). In this state, the contact of the respective pogo pins 7*a* with the respective terminals provided on the terminal pads 14*a* is ensured. Therefore, the operation of the head tester can be shifted to the test of the magnetic head 11.

The head tester enters into the testing operation of the magnetic head 11. The probe unit 7 is risen in Z direction by a predetermined amount in a case where the probe unit 7 contacts with the terminal pad as shown in FIG. 5(*c*) at a time or after when the test of the magnetic head 11 is completed as shown in FIG. 5(*b*). In such state, the handling robot 1 positions the suction head 2, which is released from the suction, on the head clamp table 50 again.

When the suction head 2 is positioned on the head clamp table 50, the fitting of the terminal pad 14*a* onto the guide hole 6*a* by the suction mechanism 6*c* is released and the clamping of the magnetic head assembly 10 on the head clamp table 50 is released. In this state, the suction surface of the cylindrical collet 2*a* guides the movement of the magnetic head assembly 10.

The magnetic head assembly 10, the clamping of which is released, is sucked by the suction head 2. On the other hand, the probe unit 7 returns to the home position and becomes a waiting state shown in FIG. 5(*a*).

The magnetic head assembly 10 sucked by the suction head 2 is returned to the original position in the tray 4 or to another tray correspondingly to a result of the test by the handling robot 1.

As described hereinbefore, the suction collet in this embodiment is cylindrical. However, the configuration of the collet is not limited to the cylindrical.

In the described embodiment, the boss pins (contact pins) are provided in the pressing arms. However, the pins may be protrusions or may be removed.

The configuration of the pressing arm in this invention is not limited to that described in the embodiment. Though the pressing arm which is provided in the suction head, the pressing arm may be provided on a elevator arm of the Z moving mechanism or the collet.

Further, in this embodiment, the pressing arm may not merely contact with the horizontal flexible cable but press the rear end portion of the horizontal flexible cable downward from horizontal.

Further, in this embodiment, the suction head sucks the flexible cable such that it is held horizontal until the handling robot transports the magnetic head assembly from the tray to the head clamp table. However, since the object of this invention is to prevent the upward warp of the rear portion of the flexible cable when it is mounted on the clamp table, it is enough to maintain the flexible cable horizontal or the rear end portion thereof downward from horizontal at least when the magnetic head assembly is mounted on the clamp table.

The invention claimed is:

1. A handling robot for mounting a magnetic head assembly on a head clamp table of a magnetic head tester by sucking a mounting base with respect to the magnetic head assembly having at least first flexible printed circuit board which has a front end portion in which a magnetic head is provided and a rear end portion on which a terminal pad connected to the magnetic head is provided, by a suction head of the handling robot, comprising
    said suction head for holding the flexible printed circuit board such that the flexible printed circuit board becomes horizontal when the magnetic head assembly is mounted on said clamp table, and
    a pressing arm provided in the suction head for preventing upward warp of the rear portion of the first flexible printed circuit board which is held horizontal,
    wherein the pressing arm is in contact with an upper surface of the first flexible printed circuit board at the rear portion of the first flexible printed circuit board.

2. A handling robot claimed in claim 1, further comprising a terminal pad pedestal on which the terminal pad is mounted and a contact probe unit having a probe, wherein said pressing arm contacts the first flexible printed circuit board horizontal to keep the first flexible printed circuit board horizontal or to push said rear side end portion down, said terminal pad is mounted on said terminal pad pedestal when the magnetic head assembly is mounted on said head clamp table and said probe contacts with a terminal of said terminal pad mounted on said terminal pad pedestal.

3. A handling robot claimed in claim 2, wherein said pressing arm includes a contact pin contacting with the first flexible printed circuit board between at least a center position of a length of the first flexible printed circuit board from the mounting base to the terminal pad and the terminal pad of the magnetic head assembly on a level of a suction surface of the suction head.

4. A handling robot claimed in claim 3, wherein the terminal pad of the first flexible printed circuit board is arranged in a horizontal plane containing a longitudinal center axis of the magnetic head assembly orthogonally to the longitudinal center axis with a predetermined offset.

5. A handling robot claimed in claim 4, wherein the magnetic head assembly has a second flexible printed circuit board having a terminal pad which is arranged in the horizontal plane containing the longitudinal center axis of the magnetic head assembly orthogonally in opposite direction to the longitudinal center axis with a predetermined offset.

6. A handling robot claimed in claim 5, wherein a plurality of said magnetic head assemblies are arranged in a tray and one of said magnetic head assemblies is sucked by said suction head and transported to said head clamp table, sequentially.

7. A magnetic head test method for testing a magnetic head of a magnetic head assembly by mounting the magnetic head assembly on a head clamp table of a magnetic head tester by sucking a mounting base with respect to the magnetic head assembly having at least first flexible printed circuit board which has a front end portion in which a magnetic head is provided and a rear end portion on which a terminal pad connected to the magnetic head is provided, by a suction head of a handling robot, the magnetic head tester having the handling robot, a pressing arm provided in the suction head and a clamp mechanism provided on a head clamp table of a magnetic head tester, comprising the steps of:
    sucking the magnetic head assembly by the suction head of the handling robot,
    transporting the magnetic head assembly to the head clamp table,
    mounting the magnetic head assembly on the head clamp table such that the flexible printed circuit board becomes horizontal and preventing an upward warp of the rearward portion of the flexible printed circuit board by pressing the rearward portion of the flexible printed circuit board by the pressing arm,
    releasing the suction for the magnetic head assembly on the head clamp table, and
    clamping the magnetic head assembly by the clamp mechanism.

8. A magnetic head test method claimed in claim 7, wherein the handling robot further includes a terminal pad pedestal on which the terminal pad is mounted and a contact probe unit having a probe and the flexible printed circuit board is made horizontal or the rear end portion of the flexible printed circuit board is pushed downward by the contact of the pressing arm, the terminal pad is mounted on the terminal pad pedestal when the magnetic head assembly is mounted on the head clamp table and the probe contacts with a terminal of the terminal pad mounted on the terminal pad pedestal.

9. A magnetic head test method claimed in claim 8, wherein the flexible printed circuit board is made horizontal or the rear end portion of the flexible printed circuit board is pushed downward by the contact of said pressing arm and, after the contact probe unit contacts with a terminal provided in the terminal pad, the suction head is retreated from the clamp table.

10. A magnetic head tester for testing a magnetic head of a magnetic head assembly by mounting the magnetic head assembly on a head clamp table by sucking a mounting base with respect to the magnetic head assembly having a flexible printed circuit board which has a front end portion in which a magnetic head is provided and a rear end portion on which a terminal pad connected to the magnetic head is provided, by a suction head of a handling robot, comprising
    said suction head for holding said flexible printed circuit board such that the flexible printed circuit board becomes horizontal when said magnetic head assembly is mounted on the head clamp table,
    a pressing arm provided on said suction head for preventing an upward warp of the rear end portion of said horizontal flexible printed circuit board and said pressing arm contacting with an upper surface of said flexible printed circuit board in the rearward end portion of said horizontal flexible printed circuit board,
    a clamp mechanism of said magnetic head assembly, provided on said head clamp table and clamping said magnetic head assembly which is mounted on the head clamp table and released from the suction of said suction head.

11. A magnetic head tester claimed in claim 10, further comprising a terminal pad pedestal on which said terminal pad is mounted and a contact probe unit having a probe, wherein said pressing arm makes said flexible printed circuit board horizontal or presses said rearward end portion thereof down by the contact with said flexible printed circuit board, said terminal pad is mounted on said terminal pad pedestal when the magnetic head assembly is mounted on said head clamp table and said probe contacts with a terminal of said terminal pad mounted on said terminal pad pedestal.

12. A magnetic head tester claimed in claim 11, wherein said pressing arm has a contact pin arranged in a position, said contact pin contacting with said flexible printed circuit board, said position being behind said mounting base by at least a half of a distance from said mounting base to said terminal pad of said flexible printed circuit board, and a level of said contact pin with respect to said flexible printed circuit board corresponds to a level of a suction surface of said suction head.

13. A magnetic head tester as claimed in claim 12, further comprising a head carriage having a head arm, wherein said terminal pad pedestal, said contact probe unit and said head clamp table are provided in said head arm.

14. A magnetic head tester as claimed in claim 13, further comprising a suction mechanism, wherein said suction mechanism is provided on the terminal pad pedestal.

* * * * *